United States Patent
Rodriguez et al.

(10) Patent No.: US 10,424,361 B2
(45) Date of Patent: Sep. 24, 2019

(54) PHYSICAL UNCLONABLE FUNCTION SYSTEM AND METHOD

(71) Applicant: Texas Instruments Incorporated, Dallas, TX (US)

(72) Inventors: John Anthony Rodriguez, Dallas, TX (US); Richard Allen Bailey, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/967,511

(22) Filed: Apr. 30, 2018

(65) Prior Publication Data

US 2019/0252016 A1    Aug. 15, 2019

Related U.S. Application Data

(60) Provisional application No. 62/628,433, filed on Feb. 9, 2018.

(51) Int. Cl.
*G11C 11/22* (2006.01)
*H04L 9/32* (2006.01)

(52) U.S. Cl.
CPC ........ *G11C 11/2275* (2013.01); *G11C 11/221* (2013.01); *G11C 11/2273* (2013.01); *H04L 9/3278* (2013.01)

(58) Field of Classification Search
CPC ............ G11C 11/2275; G11C 11/2273; G11C 11/221; H04L 9/3278
See application file for complete search history.

(56) References Cited

U.S. PATENT DOCUMENTS

| | | | |
|---|---|---|---|
| 7,729,156 B2 | 6/2010 | Rodriguez et al. | |
| 9,851,914 B2 | 12/2017 | Rodriguez et al. | |

(Continued)

OTHER PUBLICATIONS

H. Zhang, H. Jiang, M.R. Eaker, K.J. Lezon, B. Narasimham, N.N. Mahatme, L.W. Massengill, B.L. Bhuva—"Evaluation on Flip-flop Physical Unclonable Functions in a 14/16-nm Bulk FinFET Technology"—978-1-5386-5479-8/18/$31.00 © 2018 IEEE; pp. P-PR.1-1-P-PR.1-5; Vanderbilt University, Nashville, TN 37212, Broadcom Corporation, Irvine, CA 92617, NXP Semiconductors, Austin, TX 78735.

(Continued)

*Primary Examiner* — Mohammed A Bashar
(74) *Attorney, Agent, or Firm* — Rose Alyssa Keagy; Charles A. Brill; Frank D. Cimino (57) ABSTRACT

A method of generating a random number from an electronic circuit memory and/or a system with the electronic circuit memory. The memory comprises a block of ferroelectric two transistor, two capacitor (2T-2C), memory cells. The method comprises: (i) first, writing a predetermined programming pattern to the block cells in a one transistor, one-capacitor (1T-1C) mode, thusly writing, per cell, a same data state to both a first and second sub-cell of the cell; (ii) second, reading the cells in a 2T-2C mode to generate a random number comprising a random bit from each of the cells; (iii) third, restoring the random number into the cells in a 2T-2C mode, thusly writing, per cell, a complementary data state to both a first and second sub-cell of the cell, responsive to a respective random number bit; and fourth, imprinting the random number in each cell in the block.

20 Claims, 2 Drawing Sheets (56) References Cited

U.S. PATENT DOCUMENTS

2008/0175034 A1* 7/2008 Hagiwara ............ G11C 7/1006
                                                365/145
2015/0355886 A1* 12/2015 Peeters ................ G06F 7/588
                                                708/250
2017/0277459 A1* 9/2017 Rodriguez ............ G11C 11/221

OTHER PUBLICATIONS

U.S. Appl. No. 15/852,618, filed Dec. 22, 2017 which is Pending claims the benefit of U.S. Appl. No. 15/467,222 (U.S. Pat. No. 9,851,914)

* cited by examiner

PHYSICAL UNCLONABLE FUNCTION SYSTEM AND METHOD

CROSS-REFERENCES TO RELATED APPLICATIONS

This application claims priority to, the benefit of the filing date of, and hereby incorporates herein by reference, U.S. Provisional Patent Application 62/628,433, entitled "Use of Ferroelectric Memory Imprint to Generate Random Numbers and Physical Un-clonable Functions" and filed Feb. 9, 2018.

STATEMENT REGARDING FEDERALLY SPONSORED RESEARCH OR DEVELOPMENT

Not Applicable.

BACKGROUND

The example embodiments relate to a physical unclonable function systems and methods. A physical unclonable function (PUF) produces a unique number associated with an electronic component, such as an integrated circuit. Moreover, the uniqueness of the number derives from the likewise unique physical attributes of the generating circuit. Such unique physical attributes arise from any variation as between one device and the next of the same design, due to the inherent difference in each such device—for example, process variations, and unintended yet unavoidable physical electrical variances, can slightly alter the response of plural devices, all having the same intended design. The PUF circuitry possessing such variations can, in a given instantiation, be energized and a resultant data signal can be read. As a result of the device variations, the respective read data value will differ from device to device, despite the common design among those devices. In this sense, the number may be considered a digital "signature," "fingerprint," "key," or the like, of the device, all connoting each same-design device's unique data value.

The goal for a successful PUF is that for a given device, the unique (or random) value it produces is repeatable each time it is energized, so as to provide the signature of that device. Moreover, as the term "unclonable" suggests, also preferred of such devices is that the precise digital signature of one device cannot be readily cloned by another, so as to keep secure the unique value of each different PUF device, that is, to render the value of one device unpredictable from another device of the same design. Various approaches are known in the art to constructing PUFs, and heretofore such approaches have yielded repeatable randomness of about 85%, that is, for a given, repeatable, random number output from a PUF device, at least 85% of the bits of the number remain unchanged from one instantiation of the random number generation to the next. However, such an approach leaves 15% of the bits that will still change from one instantiation to the next, and there often is little or no predictability as to which bits in the total digital signature will be those that form the 15% change. Hence, the art endeavors to achieve greater repeatability or, stated alternatively, less change in the total digital signature from different instantiations thereof.

Given the preceding, the present application provides alternatives to and improvements to prior art PUF devices, as further detailed below.

SUMMARY

In an embodiment, there is a method of generating a random number from an electronic circuit memory. The memory comprises a block of ferroelectric memory cells, and each cell in the block comprises a two transistor, two capacitor (2T-2C) cell. The method comprises: (i) first, writing a predetermined programming pattern to the cells in the block, the writing performed in a one transistor, one-capacitor (1T-1C) mode, such that, for each cell in the block, a first sub-cell of the block and a second sub-cell of the block is written to a same data state; (ii) second, reading the cells in a 2T-2C mode to generate a random number comprising a random bit from each of the cells; (iii) third, restoring the random number into the cells in a 2T-2C mode such that, for each cell in the block, a first sub-cell of the block and a second sub-cell of the block is written to complementary data states in response to a respective random bit in the random number; and fourth, imprinting the random number in each cell in the block.

Numerous other inventive aspects are also disclosed and claimed.

DETAILED DESCRIPTION

Figure 1:
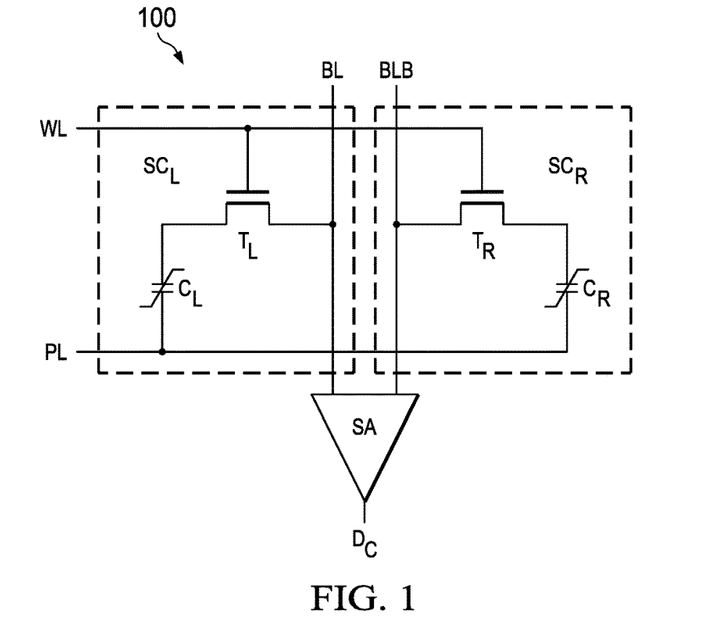
FIG. 1 illustrates an electrical schematic of an imprinted 2T-2C memory cell according to an example embodiment.

FIG. 1 illustrates an electrical schematic of an imprinted 2T-2C memory cell 100, according to an example embodiment. By way of introduction, as the 2T-2C descriptor suggests, cell 100 includes two transistor and two capacitors, and the additional descriptor of imprinted is relative to imprinting a data state into the cell, as detailed later. Looking at cell 100 in greater detail, it includes two schematically identical sub-cells, $SC_L$ and $SC_R$, where for discussion purposes the "L" and "R" subscripts are used in various locations in FIG. 1 to distinguish left and right, irrespective of absolute positioning from a functional and operational standpoint. In sub-cell $SC_L$, a wordline WL is connected to a gate of a transistor $T_L$, a first source/drain of transistor $T_L$ is connected to a bitline signal BL, a second source/drain of transistor $T_L$ is connected to a first plate of a ferroelectric capacitor $C_L$, and a second plate of a ferroelectric capacitor $C_L$ is connected to a plate line PL. In a symmetric manner, in sub-cell $SC_R$, wordline WL is connected to a gate of a transistor $T_R$, a first source/drain of transistor $T_R$ is connected to a bitline bar signal BLB, a second source/drain of transistor $T_R$ is connected to a first plate of a ferroelectric capacitor $C_R$, and a second plate of a ferroelectric capacitor $C_R$ is connected to plate line PL. Each of bitline signal BL and bitline bar signal BLB is further connected as a respective input to a sense amplifier SA, the output of which provides a single bit of cell data $D_C$.

The ferroelectric effects of cell 100 are now further introduced. Each ferroelectric capacitor $C_L$ and $C_R$ includes two conductive plates as known in the capacitor art, while the dielectric material between those plates is a polarizable ferroelectric material, such as lead zirconate titanate (PZT) or strontium-bismuth-tantalate (SBT), rather than silicon dioxide or silicon nitride as typically used in non-ferroelectric capacitors. Such ferroelectric material provides hysteresis in the charge versus voltage (Q-V) characteristic of the material, based on the polarization state of the ferroelectric material. In other words, the charge stored (and capacitance presented) by a ferroelectric capacitor is dependent, in part, on magnitude of applied electrical field and the prior state of the capacitor. Hence, as voltage applied across the capacitor increases beyond a threshold or first "coercive" voltage, the capacitor will present a first amount of capacitance and correspondingly store a first amount of charge representing a first data state. As voltage applied across the capacitor decreases from the first coercive voltage, the capacitor charge will remain the same until such time as the decreasing voltage falls below a second coercive voltage, at which point the capacitor will present a second amount of capacitance and correspondingly store a second amount of charge, representing a second data state. The first and second data states can be understood to represent respective binary states of 0 and 1, where the higher charge may be considered a binary 0 due to the lower amount of drive current needed to read that state by sense amplifier SA, and vice versa for the lower charge being considered a binary 1. Given these attributes of ferroelectric capacitors, in some arts they are implemented as non-volatile data cells, where a number of such cells can be arranged to provide a non-volatile memory store.

A typical 2T-2C write operation of cell 100 is now described, as further context and introduction to preferred embodiment aspects. To write a data state, complementary charges are stored on the two capacitors $C_L$ and $C_R$. For example, consider a first write instance: complementary voltages are asserted on BL and BLB, word line WL is asserted (e.g., active high) to enable transistors $T_L$ and $T_R$, and plate PL is pulsed so as to store the complementary charges on the two capacitors $C_L$ and $C_R$. For example, consider the following Table 1 showing the relative charges following such a write:

TABLE 1

| Capacitor | Charge | Data state |
|---|---|---|
| $C_L$ | Q+ | 0 |
| $C_R$ | Q− | 1 |

A typical 2T-2C read operation of cell 100 is also now described, also for context and introduction. To read a data state, bitline BL and bitline bar BLB are precharged to a selected voltage and then float, after which word line WL is asserted. A pulse at plate line PL causes the complementary polarization states of capacitors $C_L$ and $C_R$ to be presented as a differential signal across bitline BL and bitline bar $BLB_k$, and sense amplifier SA senses that differential signal and outputs the single bit of cell data $D_C$ based on the differential signal. For the example of Table 1, therefore, assume the polarity of sense amplifier SA is such that the difference presented between the respective charges of capacitors $C_L$ and $C_R$ corresponds to a data bit of cell data $D_C$=0. Also given this assumption, note that Table 1, and the complementary values of cell 100 represented therein, therefore represent one possible output data bit value. Accordingly, the following Table 2 illustrated the complement to Table 1, with charges and data states that would represent a complementary output data bit of cell data $D_C$=1.

TABLE 2

| Capacitor | Charge | Data state |
|---|---|---|
| $C_L$ | Q− | 1 |
| $C_R$ | Q+ | 0 |

Lastly, for either 2T-2C read instance, note that ferroelectric memory cells have the characteristic of a destructive read, that is, the read operation pulls both capacitor $C_L$ and $C_R$ to a zero data state and, therefore, destroys the complementary stored data. Thus, typically a read operation on a ferroelectric memory cell includes an immediately successive (sometimes in the same clock cycle) restorative write, performed immediately after the read, so as to restore to the cell charges as they existed prior to the read. Thus, following a read/rewrite operation of the data as shown in Table 1 or Table 2, again the charge and data states will be restored to the same values, with the output cell data $D_C$ having been captured in the process and usable for the intended application.

While the above describes a write of complementary states into each respective capacitor $C_L$ and $C_R$ of the two different sub-cells $SC_L$ and $SC_R$, it heretofore has been discovered that writing a same state into each respective capacitor $C_L$ and $C_R$ of the two different sub-cells $SC_L$ and $SC_R$ can cause sense amplifier SA to output a random value as cell data $D_C$. This discovery, among other things, is further detailed in U.S. Pat. No. 9,851,914, issued on Dec. 26, 2017 to Rodriguez, et al., co-owned with the present application, and hereby fully incorporated herein by reference. Specifically, U.S. Pat. No. 9,851,914 describes such a write as a 1T-1C write mode operation in which a write into each sub-cell (i.e., having one transistor and one capacitor) is performed, so that each capacitor in each cell is polarized into the same state, as opposed to the complementary charge/state stored in a 2T-2C write. In this manner of a 1T-1C write, therefore, each sub-cell stores the same logical value, and as further described therein, once the same-value write is performed, it is followed by a 2T-2C read. Moreover, because the sub-cells store the same logical value from the 1T-1C write, a sufficiently strong differential signal does not develop on bitline BL and bitline bar BLB, so sense amplifier SA will not trigger predictably due to the lack of a sufficient differential value. Instead, the inherent physical and operational attributes of sense amplifier SA, as well as possibly other attributes of the cell, will cause the output $D_C$ to tend toward either a logical 0 or a logical 1, based on such attributes. Examples of such physical attributes are differences in doping levels or differences in the sizes of the transistor gates and capacitor plate structures caused by the manufacturing process. Examples of such operational attributes are differences in threshold voltages or ambient temperatures. Further, because any single cell (e.g., cell 100) can be written and read in such a fashion, then a number of cells may be likewise written and then read, where the combined outputs of those cells thereby produce a multi-bit random number, the randomness being unpredictable yet caused by the physical/operations variances in each respective cell. Example embodiments are understood in part from certain of these aspects, but are further facilitated and provide alternative devices and applications, as further explored below.

Figure 2:
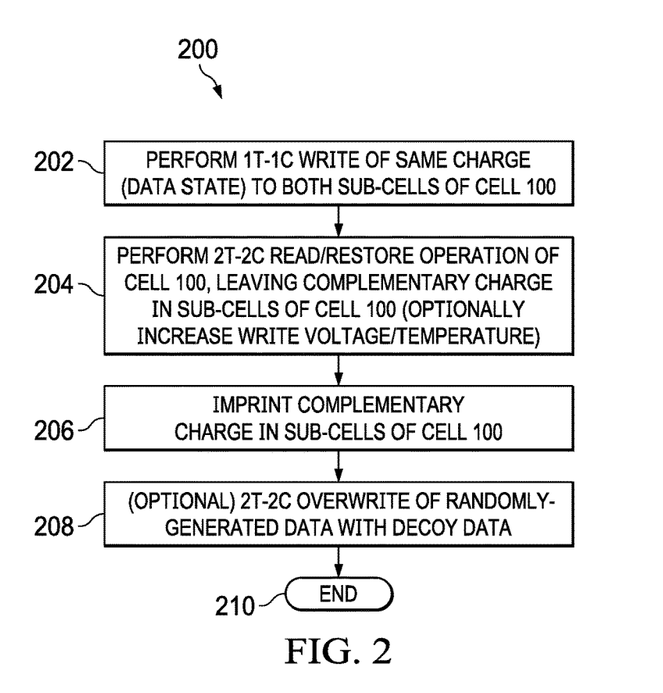
FIG. 2 illustrates a flow diagram of an example embodiment method for preparing and operating a cell as a PUF bit.

FIG. 2 illustrates a flow diagram of an example embodiment method 200 for preparing and operating cell 100 to generate a single PUF bit. As detailed later, method 200 likewise can apply, preferably concurrently, to multiple such cells so as to provide a respective bit of cell data $D_C$ from each such cell and, accordingly, the output of each such cell may be combined (e.g., concatenated) as so to form a multi-bit PUF output value. By way of introduction, method 200 may be achieved during time of manufacturing the device that includes cell 100 and may be implemented, therefore, in connection with a common manufacturing/ processing/packaging design flow, including the formation of the integrated circuit aspects that physically embody the electrical schematic of FIG. 1. Further, therefore, the steps of method 200 may be included in typical semiconductor fabrication flow and may be sequenced and accomplished via ancillary control/probe/test apparatus, as known in the art. Lastly, certain of the operations steps of method 200, while first being described as relating to preparing cell 100, also can be repeated post-manufacturing for purposes of generating (and optionally overwriting) a random numbers, as will be detailed later.

Method 200 begins at step 202, which writes a same predetermined charge and corresponding bit value (e.g., logical 0 or logical 1) into both sub-cells of cell 100, by performing the above-described 1T-1C write into each sub-cell, so as to charge each respective ferroelectric capacitor to a charge state representing a same binary value. Next, method 200 proceeds to step 204.

Step 204 performs a 2T-2C read/restore operation, as also introduced earlier in connection with the incorporated U.S. Pat. No. 9,851,914. For the read portion of the read/restore operation, word line WL is asserted, plate line PL pulsed, and sense amplifier SA outputs a bit of cell data $D_C$. As described earlier, the state of data $D_C$ is unpredictable (i.e., random), due to the inherent physical and operational attributes of cell 100 and the same charge state earlier written to both sub-cell capacitors $C_L$ and $C_R$, such that a predictable differential and sense amplifier response is not generated as between bitline BL and bitline bar BLB. For the restore portion of the step 204 read/restore operation, the logical state of the output value $D_C$ controls the writing of complementary charge values into the respective sub-cell capacitors $C_L$ and $C_R$, so that following the restore one of those capacitors stores the charge Q+, while the other stores the charge Q-, corresponding to the proper sub-cell data values as shown earlier in Tables 1 and 2. Thus, in the example binary states provided earlier, a step 204 read/restore that reads $D_C$=0 restores the sub-cell charge and corresponding data state to that shown in Table 1, whereas a step 204 read/restore that reads $D_C$=1 restores the sub-cell charge and corresponding data state to that shown in Table 2. Note, therefore, that the term restore is not to suggest that the same charge levels from the step 204 read are restored back to the sub-cell capacitors $C_L$ and $C_R$, as those charges were the same (or approximately the same) prior to the read. To the contrary, instead complementary charges are restored back to the sub-cell capacitors $C_L$ and $C_R$, so that a subsequent 2T-2C read would therefore again produce the same output value $D_C$ as did the immediately preceding step 204 read portion of the read/restore operation.

Figure 3:
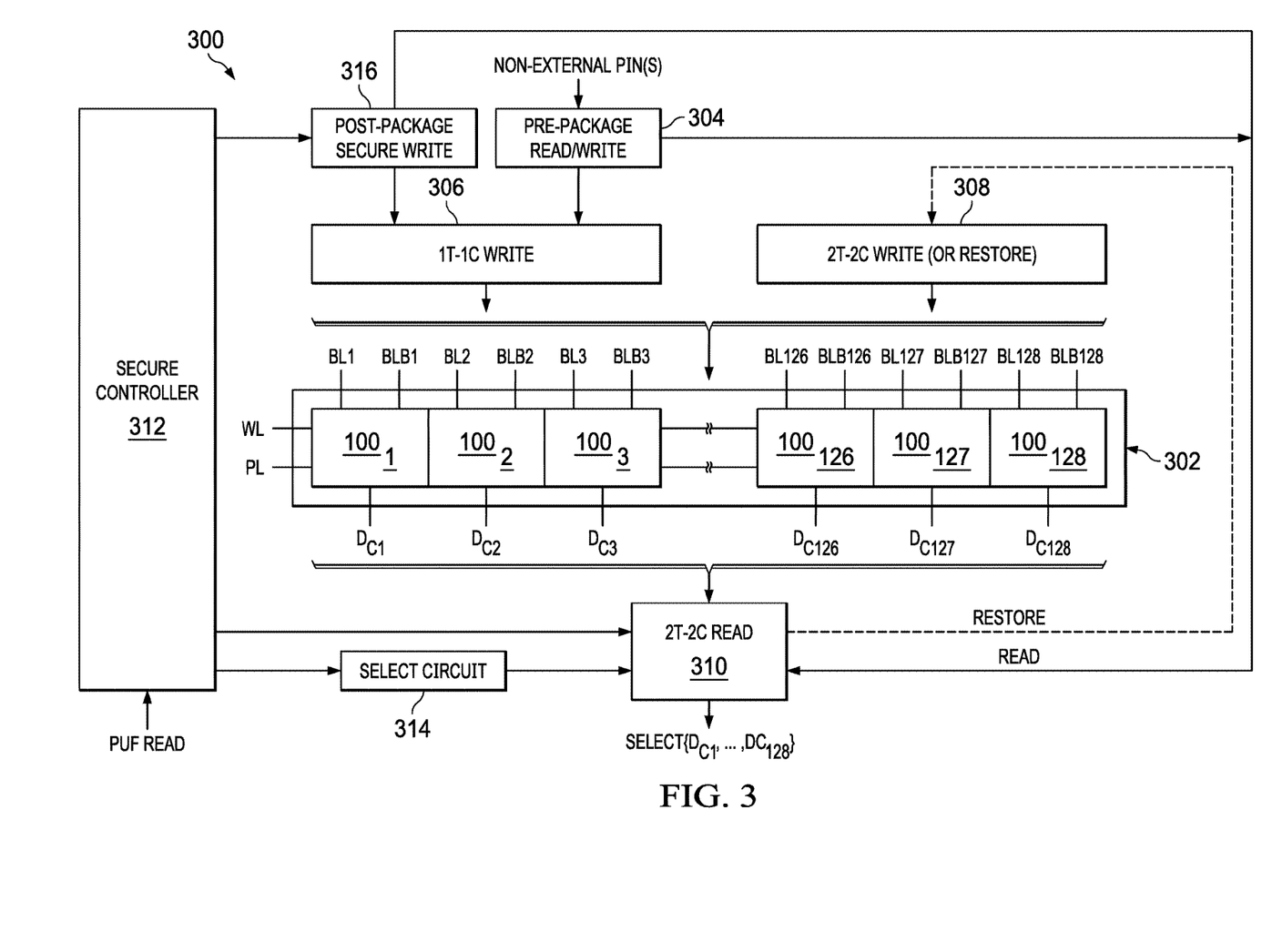
FIG. 3 illustrates a functional block diagram of a PUF system.

In another aspect of the step 204 2T-2C restore, and optionally during the restore, either one or both of the write voltage, or temperature, during the write step, is increased to or above the maximum expected (and specified) operating conditions for PUF system 300. For example, typical integrated circuit operating conditions are listed in a device specification, and may list temperature up to a limit of 85° C., and a common write voltage for contemporary ferroelectric memory cells at a limit up to 1.8 volts. For such an example, step 204 optionally performs the write at or above one or both of 85° C. and 1.8 volts. Notably, this optional step will have the effect of increasing the amount of dipoles that achieve a satisfactory charge to the desired data state (i.e., that switch domain as between Q+ and Q-, or vice versa, of the hysteresis states), per ferroelectric capacitor, effectively increasing the signal strength of the capacitor charge. This optional step may further enhance the effect of step 206, as further described below. Next, therefore, method 200 continues to step 206.

Step 206 performs what is referred to herein as an imprint of the complementary charges stored in the 2T-2C cell by the step 204 restore operation. As the term "imprint" connotes, step 206 performs one or more additional actions, beyond ordinary operation of the cell, that as detailed later further enhance the cell's tendency to be able to repeat the generation of the same random data from steps 202 and 204, thereby "imprinting" that result. As one example of a step 206 imprint, an embodiment applies a sustained heating cycle to cell 100 following the step 204 restore operation; for instance, cell 100 may be exposed to a heating cycle bake of a given temperature for a given period (e.g., 180° C. for five hours), thereby far exceeding a temperature exposure under ordinary operation or as listed as acceptable in the product specifications. In this regard, it has been observed in connection with example embodiments that at a temperature/time combination of 125° C. for one hour, the effect of electrical imprint can be detected. Moreover, the effect of the imprint can be enhanced by additional time and/or heat, such as a combination of 180° C. for five hours. Indeed, for such examples, such heat exposure may be implemented as part of the manufacturing process, such as during encapsulation or mold curing. In any event, the added heat causes a greater charge diffusion in the ferroelectric materials of the cell capacitors, thereby shifting the origin of the hysteresis loop/behavior of the cells which, as discussed below, facilitates a greater probability of recreating the same random number bit value producible by a respective cell. Next, method 200 continues to step 208.

Step 208 is an option for certain example embodiments, in which the step 206 data that was imprinted in cell 100 is overwritten with different data as an additional security measure. Specifically, recall the step 204 2T-2C read generates a random data state for cell 100, following the same-charge 1T-1C operation of step 202, where step 204 then re-writes the random data to cell 100 as part of the restore phase of the 2T-2C operation. In order to protect the random data from being obtained by nefarious uses, step 208 optionally overwrites the random data with different data, referred to herein as a decoy state (i.e., information obfuscating the actual randomly-generated value), into cell 100. Thus, the decoy data renders the randomly generated state less discoverable by nefarious users.

Method 200 completes after step 208, as shown by the end step 210. From this point forward, cell 100 may be operated as a standard 2T-2C cell, that is, written with data in a 2T-2C mode (i.e., to write complementary charge/data states to its two sub-cells), and with a subsequent 2T-2C read/restore of the cell. In one example embodiment, this 2T-2C operation can be as part of a segregated part of memory to serve solely a PUF function. In an alternative example embodiment, cell 100 may be often operated in its 2T-2C functionality for temporary memory storage, but then called upon also when the PUF value is needed; in such an approach, however, there may be indicated some limitation on excessive use of the cell for data writes, as excessive numbers of such writes may diminish the positive PUF effect of the above-described imprint, that is, to suitably and reliably recreate the same random output. In any event, such options are further explored below.

FIG. 3 illustrates a functional block diagram of a PUF system 300 that may represent a standalone PUF device or that may be included in a larger integrated system, such as part of a controller, microcontroller, microprocessor, digital signal processor, application specific integrated circuit, or the like. PUF system 300 includes a block 302 of cells $100_1$ through $100_{128}$, with the designation of "100" intended to indicate that each cell has the form of the ferroelectric memory cell 100 from FIG. 1, and the subscripts of 1 through 128 indicating successive cells for sake of reference. The use of 128 cells is only by way of example, as block 302 may include a smaller or larger number of such cells, thereby forming a ferroelectric random access memory (FRAM). Further, for a larger ferroelectric memory, either all or only some of its cells may be used for the PUF aspect, and in the latter case the non-PUF cells may serve solely as non-volatile memory storage. With respect to those cells illustrated in FIG. 3, and thereby service as PUF memory, a common word line WL and plate line PL is illustrated for read/write of each of the cells in block 302, as common in practice to a row of cells either alone, or for each row of cells when a memory is configured in an array, as also contemplated within the present inventive scope. Further, each cell has its own respective $BL_x$ and $BLB_x$ (i.e., where, $1 \leq x \leq 128$) lines for writing data to the cell and that may be read by a respective cell sense amplifier (see, FIG. 1), so as to output a corresponding bit of cell data $D_{Cx}$. Accordingly, as demonstrated in the remaining discussion, up to 128 bits of cell data (i.e., $D_{C1}$ through $D_{C128}$) may be selected as a repeatable (and unclonable) random number, thereby facilitating PUF functionality Lastly, while FIG. 3 is shown generally in block functional form, it is readily expected that one skilled in the art can implement each function illustrated and described, and also can reparation functional groupings, according to principles known the art.

Looking at additional connectivity and functional aspects of PUF system 300, a pre-package read/write block 304 is preferably accessible from one or more non-external pin(s), such as by test/programming equipment during manufacture. Further, therefore, once PUF system 300 is complete, such pins are not accessible and, therefore, there is not direct access to block 304 for security reasons. Pre-package read/write block 304 has control outputs to both a 1T-1C write block 306 and a 2T-2C write (or restore) block 308. Each of blocks 306 and 308 is coupled to the BL and BLB lines to all of the cells in block 302, so as to control the 1T-1C write of step 202 and the write/restore portion or phase of step 204, respectively, from FIG. 2. PUF system 300 also includes a 2T-2C read functional block 310, so as to control the 2T-2C read portion of step 204 from FIG. 2. In one example embodiment, 2T-2C read block 310 operates, in response to a secure controller 312 receiving a PUF READ control signal, to read the entire 128 bits of cell data $DC_1$ through $DC_{128}$ from block 302 and provide those bits as a PUF output random number. In an alternative example embodiment, controller 312 operates a select circuit 314, again responsive to a PUF READ signal, and select circuit 314 controls 2T-2C read block 310 to select only certain bits, either contiguous or non-contiguous, from the 128 outputs of block 302 and to thereby provide less than 128 bits as the PUF output random number. Lastly, PUF system 300 includes a post-package secure write block 316, which as discussed below can, after PUF system 300 has been packaged in the manufacturing flow, control 1T-1C write block 306 so as to cause a 1T-1C write to the cells in block 302, under secure operations, such as privilege mode or secure mode, as implemented with additional hardware and/or software, or the like.

The operation of PUF system 300 is now described, first in connection with the application of the already-described steps of method 200 to PUF system 300, as applied now to the 128 cells of block 302. In connection with the manufacturing and in-line testing of PUF system 300, first, control through non-external pin(s) to pre-package read/write block 304 causes 1T-1C write block 306 to perform a 1T-1C write to the 128 cells in block 302, so that each cell has the same charge in both of its sub-cells. The charge written in this operation, on a per-cell basis, is defined by a predetermined binary pattern, referred to herein as a programming pattern. The programming pattern can be any pattern, so long as the pattern is known to, and reproducible by, the process. For example, the programming pattern may be all binary 0's, all binary 1's, or some combination of the two, so long as within each cell, the binary value from the programming pattern, and corresponding to that cell, is represented in both sub-cells of the cell. As one example for sake of discussion, assume that the programming pattern is all binary 0's; accordingly, each sub-cell stores a charge corresponding to a binary 0. As another example, assume the programming pattern alternates, from a binary 0, to a binary 1, to a binary 0, to a binary 1, and so forth; in this case, a first cell. corresponding to the first binary 0, has the same charge (indicating binary 0) in both of its sub-cells, while a second adjacent cell, corresponding to the first binary 1, has the same charge (indicating binary 1) in both of its sub-cells, and so forth. Also for reasons evident later, note that preferably the programming pattern is stored within, or creatable from, a block within PUF system 300, such as 1T-1C write block 306.

Next, pre-package read/write block 304 controls 2T-2C read block 310 and 2T-2C write block 308 to perform a 2T-2C read/write to the 128 cells in block 302. First, therefore, block 304 controls 2T-2C read block 310 to read the 128 cells, and recall from step 204, above, the read causes the sense amplifier of each respective cell to generate an output data bit of cell data $D_C$ that will have a random value, resulting from the same-charge in each cell's sub-cell and from the inherent physical and operational attributes of the cell. Second, and as shown by a dashed line from block 310 to block 308, and as common in a 2T-2C read process, the read phase is followed by a restore phase, where the restore writes complementary charges in each cell's respective sub-cells and to match the output data $D_C$ from the immediately-preceding read of the same cell. Following this restore phase, therefore, whereas each of the 128 cells of block 302, prior to the read of the cell, stored matching charge in the sub-cells of that cell (that charge being prescribed by the programming pattern), following the 2T-2C restore phase the sub-cell charges, per cell, are complementary. In one example embodiment, note that the restore phase may be done at above-normal operating parameters so as to augment the random number repeatability that results from the imprint. Thereafter, a bake cycle is applied, either at this point or later, so as to imprint the complementary 2T-2C restored values into the 128 cells of block 302. Once the imprint is achieved, then a 128-bit random number is effectively stored by the collective bits across cells $100_1$ through $100_{128}$. For subsequent use of PUF system 300, this 128-bit random number can remain in the non-volatile store of each cell, or optionally decoy data of step 208 may be written, again under control of the non-external pin(s) and a 2T-2C read/write operation of block 304 (in combination with blocks 308 and 310), to some or all of the cells in block 304. Note that not all 128 cells need be overwritten with decoy data, as any change to the collective 128 bit random number will render that number undiscoverable, so if preferable only one or more, but less than all, of cells $100_1$ through $100_{128}$ need be overwritten with decoy bits.

Following or concurrent with the above, PUF system 300 may follow additional fabrication steps, including chip separation or "singulation," wire or other bonding, and ultimately molding/packaging and other package testing (which can include the imprint bake if the decoy bits are not yet written to block 302). Thereafter, PUF system 300 is sold/released to customers, such as original equipment manufacturers or others, where as detailed below PUF system 300 is then operable as a PUF, able to repeatedly produce the random number from block 302 when appropriate, even if decoy data is written into parts or all of block 302, or if block 302 is otherwise used also as part of normal 2T-2C memory storage.

Further to the preceding, PUF system 300 may be implemented in various PUF applications, that is, those where a repeatable random number is used or required. Such applications include device authentication, security encryption, and the like, typically where challenge-response is implemented. Challenge-response typically has one device provide a challenge inquiry, and the responding device, here including PUF system 300, provides a response to the challenge that must satisfy the challenge-issuing device before next steps of trusted communications proceed. In this regard, the repeatable random number of PUF system 300 provides the response to the challenge, the response being or including a unique identifier, akin to a password or signature, from the random number provided by PUF system 300 (and the device that includes it). Accordingly, for PUF system 300, and after it, or the device including it, is manufactured, PUF READ is asserted at an appropriate time so that PUF system 300 may serve as a PUF. For example, PUF READ may be asserted at start-up, as part of a built-in-self-test (BIST) or other testing function, or once a challenge is provided from another device to PUF system 300. The asserted PUF READ is passed to secure controller 312, and may occur from a pin that is accessible externally from PUF system 300. To protect against piracy or the like, however, now the operation of PUF system 300 proceeds under the further "secure" protection of secure controller 312, which may include one or more secure aspects known or ascertainable to one skilled in the art. As described below, therefore, secure controller 312 now controls the re-generation of the random number that also was generated during the manufacturing related steps of PUF system 300, but does so under the secure environment and may be achieved without access to the non-external pin(s) originally used, so as to protect against undesirable interference or theft of the random number through other means.

Under control of secure controller 312, and in response to the asserted PUF READ, controller 312 enables post-package secure write block 316. In response, block 316 controls 1T-1C write block 306 to perform a 1T-1C write of the programming pattern into the cells of block 302; in this regard, note that block 306 may store either the programming pattern internally or may include circuitry for repeatedly being able to provide that number. Recall the programming pattern can be all binary 0's, all binary 1's, or some combination of the two, where for each cell its corresponding data state is written by applying a same charge, for that state, into both sub-cells of the cell. Next, post-package secure write block 316 causes a 2T-2C read/restore of the cells of block 300, by controlling both 2T-2C read block 310 to perform the read and 2T-2C write (or restore) block 308 to then restore the read data. The present inventors have observed that for repeat instantiation of the 1T-1C write of the programming pattern, after the steps of method 200, PUF system 300 will restore the same random number as earlier observed during manufacturing, with a very high degree of repeatability across most if not all of the random number bits. Such repeatability can be above 95%, and indeed has been measured as high as over 99% (e.g., 99.7%), that is, for a number N bits, each time the 1T-1C write of the programming pattern is followed by a 2T-2C read, 95% to 99.7% of the read data from the cells of block 302 will be the same random number as observed during manufacture. Moreover, such repeatability also has been observed even if decoy data is earlier stored in one or more of the block cells following the earlier generation of the random number. Indeed, such repeatability also has been confirmed even with the decoy data having been written at an elevated temperature, thereby simulating long term overwriting of the random number. Hence, the random number is difficult or impossible to predict external from PUF system 300, but is highly repeatable by the system itself, which is the essence of a PUF. Moreover, the percentages achieved by PUF system 300 may well exceed various other approaches to PUF implementation, which typically must rely heavily on additional corrective measures, such as error correction, parity, or the like, to serve PUF functionality. The example embodiments also may include such supplemental correction techniques, but may well outperform prior approaches considerably and are therefore expected to be greatly applicable to numerous designs calling for PUF functionality.

In one example embodiment, and further in response to the asserted PUF READ, post-package secure write block 316 also causes block 308 to perform a 2T-2C restore of the now repeated, yet random, number to be restored into the cells of block 302. At this point, therefore, the cells of block 302 continue to store the 128 random data bits, where those bits may remain for subsequent access during a next challenge. Optionally, however, secure controller 312 also can cause an additional write of decoy data over one of more the 128 random data bits to thereby obfuscate the random number, so that such bits no longer collectively represent the random number. In an alternative example embodiment, the 2T-2C restore may be inhibited from occurring as a second phase in the read/restore operation, or that phase may otherwise not be caused to occur, after the 2T-2C random number read. In this approach, therefore, the 2T-2C read will have been destructive of the cell data (i.e., the charge on the ferroelectric material will be discharged by the read), thereby providing an alternative manner of obfuscating the random number from subsequent read or evaluation by an unauthorized user (i.e., without an additional 1T-1C write according to the programming pattern). In either case, therefore, the nefarious discoverability of the unique and random number associated with PUF system 300 becomes less discoverable.

Completing the operational discussion of FIG. 3, note that PUF system 300 also optionally includes select circuit 314 coupled between secure controller 312 and 2T-2C read block 310. Such inclusion provides additional protection against wrongful discovery of the random number that may be generated by PUF system 300. Specifically, in an example embodiment, where a number of bits RNB are needed by the application for the desired random number, a larger number of cells C, greater than RNB, are included in block 302. For example, PUF system 300 may be used for a desired random number having RNB=64 bits. Then, when PUF READ is asserted, PUF system 300 produces 128 random bits according to the circuits and functionality described above, but secure controller 312 operates select circuit 314, and select circuit 314 then selects a subset of RNB (e.g., 64) bits from the C (e.g., 128) cells. In this manner, therefore, if undesirable third party access is achieved to the entire 128 bit value in the total of 128 cells of block 302, there is still an additional level of security provided in that it will not be readily evident as to which, or how many of those cells' data, are used for the ultimate RNB-bit output random number. Thus, select circuit 314 may be included for selecting a subset of the total data bits from block 302, or it may be operated or eliminated so that all 128 bits from block 302 are output as the PUF's random number. Still further, with or without select circuit 314, in yet another example embodiment aspect, note that a user may operate system 300 so that only portions of the block 302 bits are used as the final random number output, that is, in effect using software and/or logic functions comparably to select circuit 314. In this manner, again an intruder or the like attempting to read the entirety of block 302 would not readily be informed of which subset of bits therein are those that are ultimately used for the device signature, key, or the like. For example, the user/programmer could use a different portion of block 302 for each different revision of a device that included it, where the respective portion of block 302 per revision is that selected (either by select circuit 314 or by software/logic technique) to provide the PUF random number. As another example, even for a single PUF device, software and/or logic could further manage instances for that device whereby at different times for the same device, the data from different cells of block 302 are used to provide the PUF random number for different instance(s). Still other examples may be ascertained by one skilled in the art.

From the above, various example embodiments provide a PUF system and method. Various example embodiments have various respects and/or benefits. For example, repeatability of the randomly generated number is assured at rates greater than 85% and upward or close to 100%, without additional parity or condition checks, the latter of which may be added to converge to 100%. As another example, various additional aspects may be added to render the unique PUF random number immune from discovery by third parties, such as those involved in piracy or theft actions that seek to discover the random number via unauthorized manners. As still another benefit, the system may be part of a larger system, such as an FRAM, where the random-number generating cells in some instances serve as part of the FRAM for storage of other data, or where those cells are isolated but still part of a larger-constructed memory block or array. Accordingly, while various alternatives have been provided according to the disclosed embodiments, still others are contemplated and yet others may be ascertained by one skilled in the art. Given the preceding, one skilled in the art should further appreciate that while some embodiments have been described in detail, various substitutions, modifications or alterations can be made to the descriptions set forth above without departing from the inventive scope, as is defined by the following claims.

The invention claimed is:

1. A method of generating a random number from an electronic circuit memory, the memory comprising a block of ferroelectric memory cells, each cell in the block comprising a two transistor, two capacitor (2T-2C) cell, the method comprising:
first, writing a predetermined programming pattern to the cells in the block, the writing performed in a one transistor, one-capacitor (1T-1C) mode, such that, for each cell in the block, a first sub-cell of the block and a second sub-cell of the block is written to a same data state;
second, reading the cells in a 2T-2C mode to generate a random number comprising a random bit from each of the cells;
third, restoring the random number into the cells in a 2T-2C mode such that, for each cell in the block, a first sub-cell of the block and a second sub-cell of the block is written to complementary data states in response to a respective random bit in the random number; and
fourth, imprinting the random number in each cell in the block.

2. The method of claim 1 wherein the imprinting step comprises heating the electronic circuit memory.

3. The method of claim 1 wherein the imprinting step comprises heating the electronic circuit memory to a temperature of at least 125° C.

4. The method of claim 1 wherein the imprinting step comprises heating the electronic circuit memory to a temperature of at least 125° C. for at least one hour.

5. The method of claim 1 wherein the imprinting step comprises heating the electronic circuit memory to a temperature of at least 180° C. for at least one hour.

6. The method of claim 1 and further comprising packaging the electronic circuit memory.

7. The method of claim 6 and further comprising, after the packaging step:
fifth, writing the predetermined programming pattern to the cells in the 1T-1C mode; and
sixth, reading the cells in the 2T-2C mode to generate the random number comprising the random bit from each of the cells.

8. The method of claim 7 and further comprising, seventh, obfuscating data in the cells.

9. The method of claim 8 wherein the step of obfuscating comprises writing at least a subset of the cells in a 2T-2C mode with data other than the random number.

10. The method of claim 8 wherein the step of obfuscating comprises inhibiting a 2T-2C restore write in connection with the step of sixth step of reading the cells in the 2T-2C mode.

11. The method of claim 6 wherein the step of fifth, writing the predetermined programming pattern to the cells in the 1T-1C mode comprises writing in a secure mode.

12. The method of claim 11 wherein the step of first, writing a predetermined programming pattern to the cells in the block, comprises writing the predetermined programming pattern in response to access from at least one non-external pin.

13. The method of claim 1 and further comprising, fifth, writing at least a subset of the cells in a 2T-2C mode with data other than the random number.

14. The method of claim 1:
wherein the electronic circuit memory has operating temperature specifications that specify an upper temperature limit; and
wherein the step of third, restoring the random number comprises restoring the random number with a write at approximately the upper temperature limit.

15. The method of claim 1 and further comprising:
packaging the electronic circuit memory; and
after the packaging step:
writing the predetermined programming pattern to cells in the 1T-1C mode; and
reading a subset of cells from the block in the 2T-2C mode to generate the random number comprising the random bit from each cell of the subset of cells.

16. The method of claim 1 and further comprising:
packaging the electronic circuit memory; and
after the packaging step:
- writing the predetermined programming pattern to cells in the 1T-1C mode; and
- reading the block in the 2T-2C mode to generate a first random number comprising the random bit from each cell of the cells;
- providing the random number as a subset of the first random number.

17. A method of operating an electronic imprinted circuit memory for generating a random number, the memory comprising a block of ferroelectric memory cells, each cell in the block comprising a two transistor, two capacitor (2T-2C) cell into which the random number is imprinted by a preliminary 1T-1C write followed by a 2T-2C read and heat cycle, the method comprising:
- writing the predetermined programming pattern to the cells in the 1T-1C mode; and
- reading cells in the block in 2T-2C mode to generate the random number comprising the random bit from each of the read cells.

18. The method of claim 17 and further comprising, after the reading step, obfuscating data in at least some of the cells in the block.

19. The method of claim 18 wherein the step of obfuscating comprises writing at least a subset of the cells in the block in a 2T-2C mode with data other than the random number.

20. An electronic circuit memory for generating a random number, comprising:
- a block of ferroelectric memory cells;
- each cell in the block comprising a two transistor, two capacitor (2T-2C) cell, when each pair of two capacitors in a respective cell comprises ferroelectric material conditioned:
    - first by writing a same data state to both capacitors in the cell;
    - second by a 2T-2C read of the cell;
    - third by a restoration of complementary charging of both capacitors in the cell in response to a data state from the 2T-2C read of the cell; and
    - fourth by applying a heat cycle to the complementary charging of both capacitors in the cell.

* * * * *